Oct. 31, 1939.  H. C. RHODES  2,178,406
DOUGH DIVIDING MACHINE
Filed June 2, 1936  3 Sheets-Sheet 1

Oct. 31, 1939.   H. C. RHODES   2,178,406
DOUGH DIVIDING MACHINE
Filed June 2, 1936   3 Sheets-Sheet 2

Inventor:
Herbert C. Rhodes
by
Atty

Oct. 31, 1939. H. C. RHODES 2,178,406
DOUGH DIVIDING MACHINE
Filed June 2, 1936 3 Sheets-Sheet 3
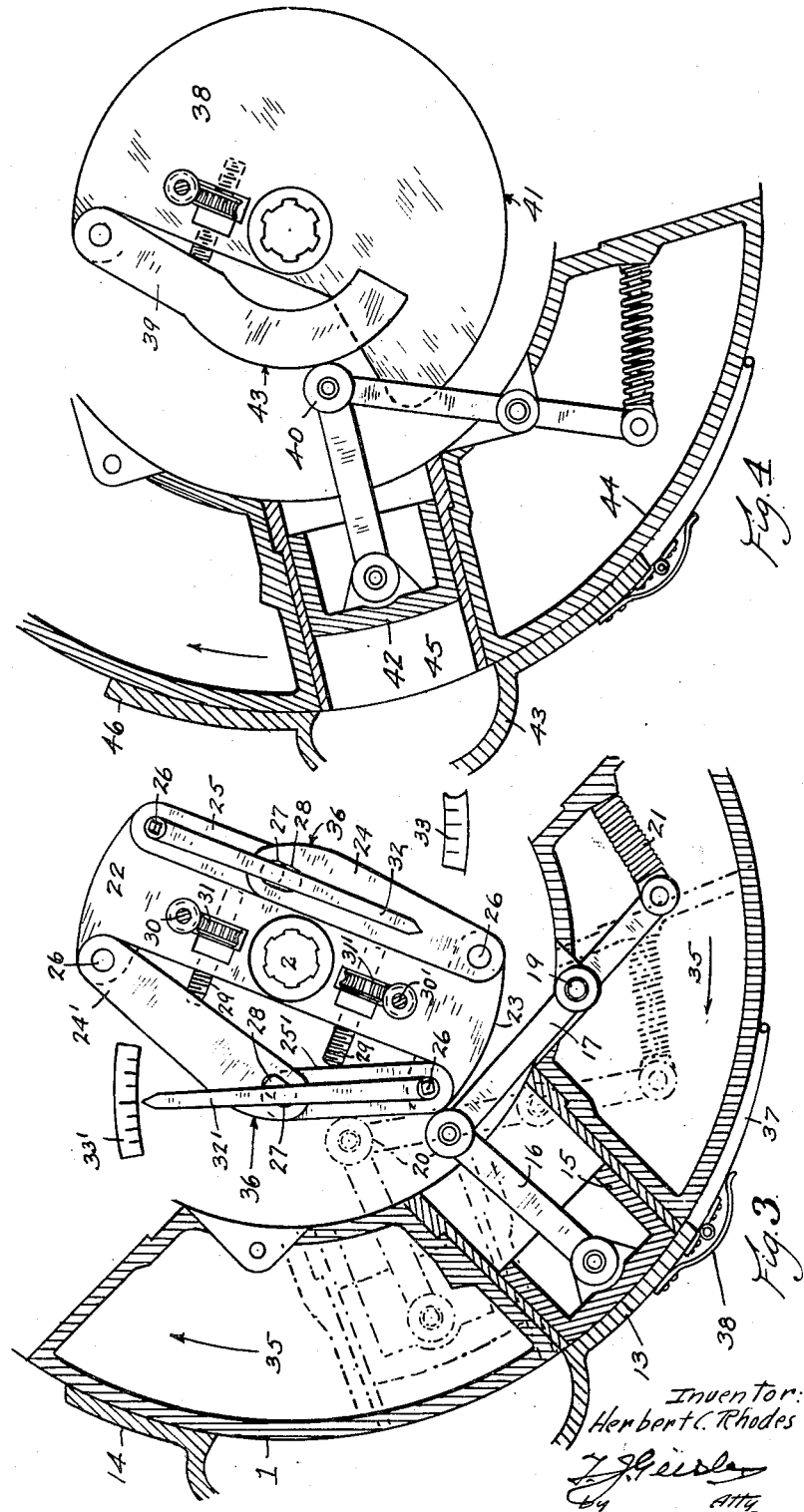

Patented Oct. 31, 1939

2,178,406

UNITED STATES PATENT OFFICE 2,178,406

DOUGH DIVIDING MACHINE

Herbert Cecil Rhodes, Portland, Oreg., assignor to American Machine & Foundry Company, New York, N. Y., a corporation of New Jersey Application June 2, 1936, Serial No. 83,102

5 Claims. (Cl. 107—15)

My invention relates to machines for dividing plastic material into equal sized lots, and relates particularly to a machine for dividing dough into small batches for the making of bread loaves, rolls, etc. My invention is an improvement upon the dough dividing machine set forth in my Patent No. 1,793,981 issued February 24, 1931.

In my Patent No. 1,793,981 the dough dividing machine includes a dough container in which dough is maintained under pressure, the pressure being furnished by compressed air; and the dough container is provided with a discharge or feed neck thru which the dough is fed to dough measuring pockets or cylinders, provided in a rotating carrier or table, thus filling such cylinders serially. In the machine in my prior patent the construction is such that air is admitted into the measuring cylinders as soon as they have been emptied of the dough, and it is necessary therefore to expel all air entrapped in each cylinder before it is again filled with dough; otherwise the air so entrapped and compressed in the cylinder would interfere with the complete filling of the cylinder with dough, thus causing lack of uniformity in the batches of dough measured by the cylinders. Furthermore, the expulsion of the air from each cylinder by the outward stroke of the plunger, as the cylinder is coming into registration with the feed neck of the dough container, produces a sound like an explosion, rendering the operation of the machine very noisy.

One of the objects of my present invention is to eliminate the above mentioned objectionable features, and thereby produce a more efficiently operating machine.

This object I accomplish by enlarging laterally the discharge end of the throat of the feed neck provided on the dough container, and by timing the strokes of the plungers, respectively, so that after a plunger has completed its outstroke, and thus emptied the corresponding dough measuring cylinder, the automatic retraction of the plunger will be delayed until the measuring cylinder again registers with the said lateral extension of the throat of the feed neck; and the complete retraction of the plunger will then be quickly effected so that the measuring cylinder may be completely filled from the container within the brief interval the cylinder traverses the feed neck. By this construction each cylinder is kept constantly closed by its plunger until registration of the cylinder with the dough feeding neck, hence no air enters the cylinders after said registration. The dough impelled by the air pressure in the container will follow the receding movement of the plunger, and thus fill the cylinder. After the cylinder moves out of registration with the neck the plunger will then discharge the dough received in the cylinder, and, after having done so, the plunger will be retained in its outer position until the cylinder again registers with the lateral extension of the feed neck.

The said movements of the plungers are effected and controlled by a cam of special design. Since the size of the individual batches of dough taken from the container and feed neck is determined by the extent to which the plungers are receded or moved inward while the cylinders are in registration with the feed neck, it is possible to regulate the size of the individual batches of dough delivered by controlling the inward stroke of the plungers.

A further object of my invention is to make the extent of the inward stroke of the plungers adjustable.

This object I accomplish by providing special adjustable elements on my cam by which the recession of the plungers can be varied at the will of the operator.

Preferably my invention is constructed so as to provide a machine adapted to take batches of dough simultaneously from different containers.

When taking amounts of dough from different containers simultaneously, it is desirable to be able to vary the size of the amounts taken from each separate container; in other words, to make loaves of different sizes from the dough fed from different containers. This I accomplish by adjusting the strokes or extent of recession of the plungers separately for each cylinder by means of a special adjustable cam element.

A further, especially important object of my invention is to assure that uniform batches of dough will be delivered by my machine without the employment of means filling the measuring cylinders thereof by the aid of high pressure. In the prior dough dividing machines known to me, such uniform delivery was not attainable, because the dough has occluded therein more or less air and other gases, which, if not liberated and permitted to escape from the dough before entering the measuring cylinders, tend to introduce into the latter an amount of gases sufficient to occupy a substantial portion of the measuring cylinders, and proportionately reduce the amount of dough which the cylinders will receive. I have discovered that the gases occluded in the dough may be dispersed by cutting in the dough transverse furrows, by passing the dough through a grid in its transit from its source of supply to the measuring cylinders. In that way substantially all the gases are liberated and escape by such furrows, thus insuring the filling of the measuring cylinders, respectively, to their full predetermined capacity, and uniformity in the batches of dough delivered by my machine.

The details of construction and manner of operation of my invention are hereinafter set forth with reference to the accompanying drawings, in which:

Fig. 3 is a fragmentary view of a portion of the section shown in Fig. 2, but illustrating different positions of one of the reciprocating plungers during the operation of my device;

Fig. 4 is a fragmentary view, partly in section, illustrating a modified cam element in my device; and Fig. 5 is a section on the line 5—5 of Fig. 1 but drawn on a larger scale.

Figure 1:
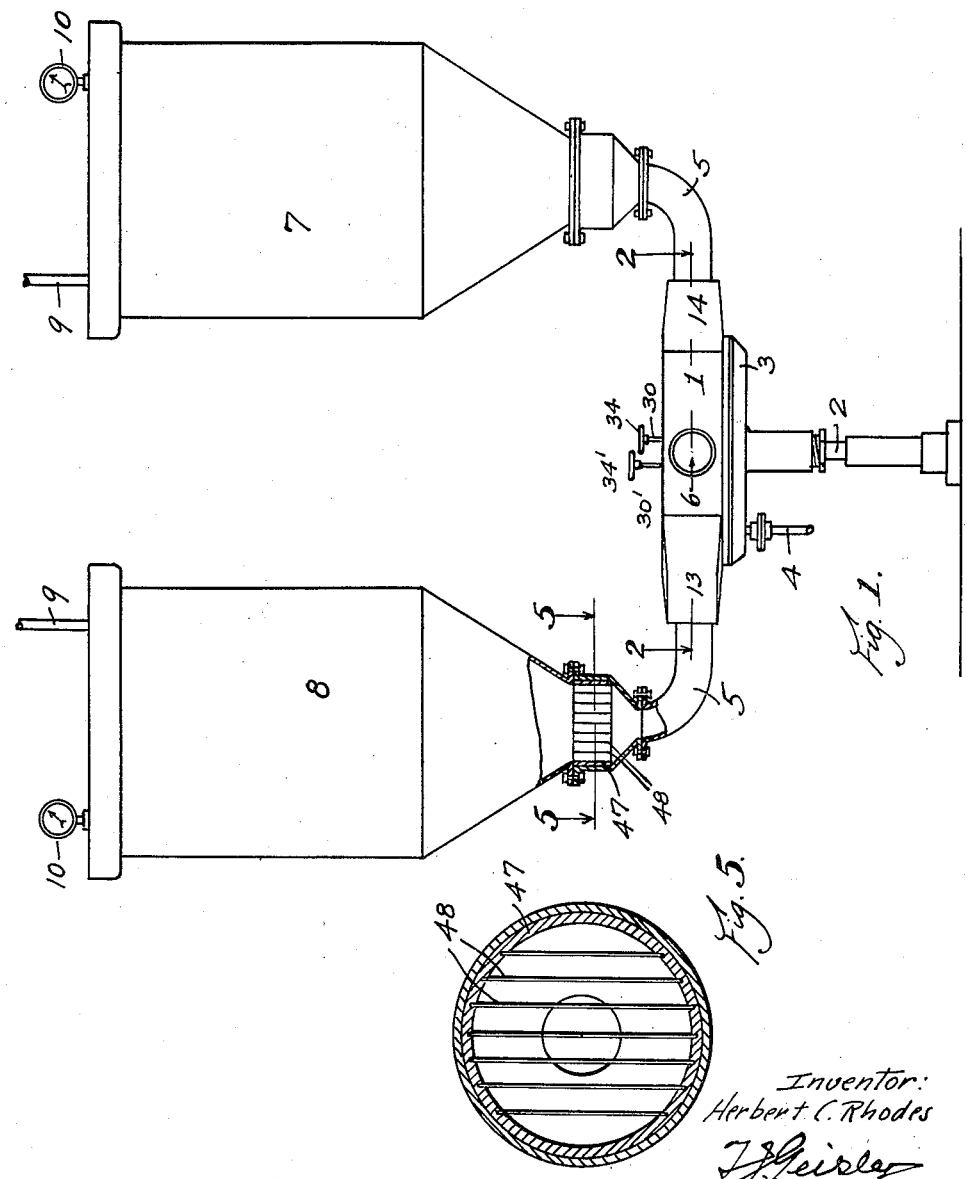
Fig. 1 is a side elevation of my device, more or less diagrammatic, illustrating my dough divider in use with two dough containers.

Referring first to Fig. 1, an annular rotating table 1 is horizontally and centrally mounted for rotation on a suitable vertical standard or shaft 2. The bottom side of rotating table 1 has an annular flange 3 with gear teeth on its inner periphery adapted to mesh with a gear rigidly mounted on a shaft 4, which shaft is driven in any suitable means (not shown). The rim of rotating table 1 is provided with equal size, equally spaced, cylindrical chambers 6. 7 and 8 designate containers in which the dough (or other plastic material) to be divided is placed. The dough should be kept in such containers under air pressure for most efficient work, and pipes 9, connected to a suitable source of compressed air, maintain such pressure within the containers 7 and 8. The covers of said containers are provided with pressure gauges 10. Each container discharges thru a feed neck 5.

Figure 2:
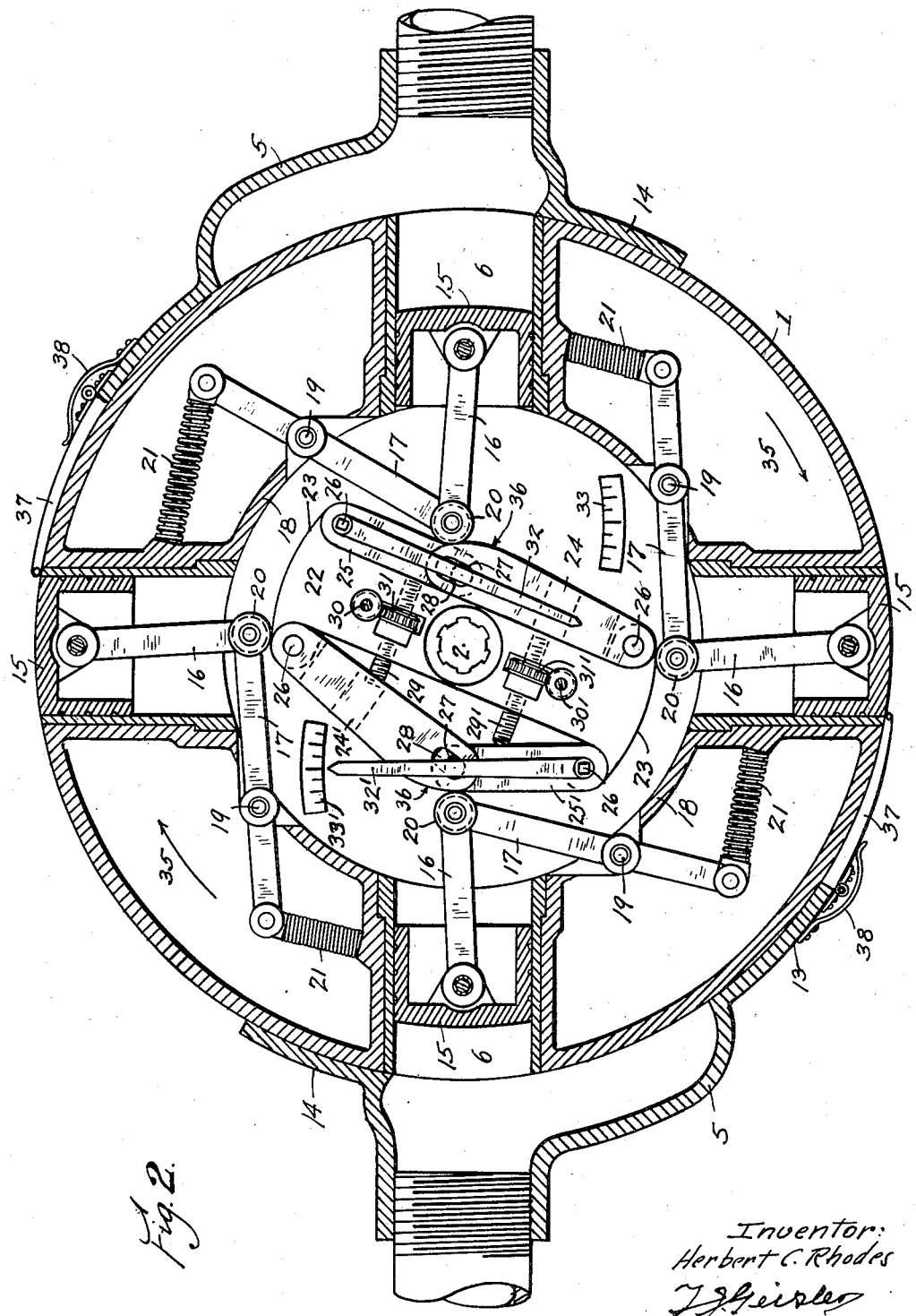
Fig. 2 is a horizontal section, partly diagrammatic, taken approximately on the line 2—2 of Fig. 1, but drawn to a larger scale.

The feed ends of the necks 5 are adapted to fit against the rim of the rotating table 1, as shown in Fig. 2. Each feed neck 5 is provided with lips 13, 14, which fit against the rim of rotating table 1, the said lips extending around the perimeter of the table for a distance equal at least to the diameter of the cylindrical chambers 6. The purpose of the lips 13, 14 is to provide an air-tight seal between the mouth of the discharge neck 5 and the perimeter of the rotating table 1 as the table rotates, and the throat of the feed neck has a lateral enlargement extending in the direction opposite to that of the rotation of the table.

The cylindrical chambers 6 are adapted to receive dough from a feed neck 5 as the table 1 is rotated. Within the cylindrical chambers 6 reciprocating plungers 15 are provided, which plungers serve not only to assist in drawing the dough into the cylindrical chambers 6 when the cylindrical chambers are in registration with a feed neck 5, and then to expel the dough from the cylindrical chambers when the latter have passed beyond such feed neck and sealing lips, but the regulation of the recession or inward stroke of the plungers 15 also determines the capacity of the cylindrical chambers 6 at the time they are filled with dough from the feed neck 5.

The plungers 15 are connected by links 16 to one of the ends of pivoted arms 17. The arms 17 are pivoted to an inner peripheral wall 18 of the rotating table 1 at the points 19. Rollers or cam followers 20 are provided at the connection between links 16 and the pivoted arms 17. The other ends of the arms 17 are connected by means of compression springs 21 to ribs in the rotating table 1.

Within the hollow center of rotating table 1 a stationary cam element is located. This comprises a cam plate 22 rigidly mounted on shaft 2 and about this cam plate the table 1 rotates. The purpose of the cam plate 22 is to provide bearing surfaces for the rollers or cam followers 20 and thus, due to the action of the compression springs 21, to cause reciprocation of the plungers 15 as the table 1 rotates. It is apparent from the construction shown in Fig. 2 that the compression springs 21 will cause the rollers or cam followers 20 to bear constantly against the rim of the cam plate 22.

One form in which the cam plate may be made is shown in Figs. 2 and 3. The cam plate 22 in these figures is elongate, and is provided with short, convex ends 23 which represent arcs of a circle concentric with the perimeter of the table 1. The cam plate 22 is provided at opposite sides with complementary angularly adjustable cam arms 24 and 25 and 24' and 25', which are pivoted to the body of the cam plate at the points 26. The cam arms 25 and 25' have pins 27 at their free ends, which pins 27 engage in slots 28 provided in the arms 24 and 24'. The arms 25, 25', and with them cam arms 24, 24', are adapted to be moved outwardly by means of adjustment screws 29 and 29', which in turn are operated by adjusting shafts 30 and 30' by means of worm gears 31, 31', or any other suitable connection. Pointers 32, 32' are attached to the arms 25 and 25' to indicate on gauges 33 and 33' the extent to which the pairs of arms 24, 25 and 24', 25' have been moved outwardly. The shafts 30 and 30' may be turned by any convenient means; for example, they may have hand wheels 34, 34' attached at their tops as indicated in Fig. 1.

In Figs. 2 and 3 the pair of adjustable arms 24', 25' of the cam element is shown adjusted so as to reduce the inward stroke of the plunger 15 as the cam followers 20 pass over the arms 24', 25'. The other pair of arms 24, 25 is shown in extreme inward position permitting the maximum recession or inward stroke of the plungers 15.

Operation

It is apparent from Figs. 2 and 3 that, as table 1 rotates in a clockwise direction, as indicated by arrow 35, the plungers 15 respectively will be in extreme outward position as the cam followers 20 pass around the convex ends 23 of the plate 22 of the cam element and the plungers will be moved inward as their cam followers move along cam arms 25 or 25' until the plungers reach their extreme inward position, which will be when their cam followers reach the juncture between cam arms 25 and 24 or 25' and 24'. The bearing surface of the free ends of cam arms 24, 24' is curved as indicated at 36; such curvature representing an arc of a circle concentric with the circumference of rotating table 1. Consequently, when the cam followers 20, in moving from arm 25 or 25' to arm 24 or 24', pass over the curved surface 36, the plungers 15 remain stationary for a while and then begin their outward stroke as their cam followers 20 move along arm 24 or 24'.

Fig. 3 shows a plunger 15 in its outermost position just before starting its inward stroke. The broken lines in Fig. 3 show the same plunger during the inward stroke, when its cam follower 20 has passed about half the distance along the arm 25'. In Fig. 2 the same plunger is positioned at the end of its inward stroke.

The operation of my device may now be described with reference to Figs. 1, 2 and 3, and with reference to the container on the left, that is the container designated 8 in Fig. 1. It is assumed that the dough in this container is to be made into smaller sized loaves. The adjustable arms 24', 25' are set by means of hand wheel 34', until the pointer 32' indicates on the gauge 33' the desired reduction in size of the lots into which the dough in container 8 is to be divided. As the table 1 turns in clockwise direction, as indicated by the arrows 35, the cylindrical chambers 6 successively come into registration with the sealing lip 13 of the container in question, namely, lip 13 on the left. When a cylindrical chamber 6 comes into registration with this lip its plunger 15 is still in extreme outward position. The plunger then begins its inward stroke. The sealing lip prevents any air from the outside being drawn into the chamber 6 as the plunger moves inward. The dough, due to the air pressure in the container supplemented by the suction action occasioned by the inward movement of the plunger, fills the cavity created in the cylindrical chamber. When the plunger has reached the extent of its inward stroke, this extent being determined by the position of the adjustable arm 25', the cylindrical chamber will then contain the predetermined amount of dough. The plunger holds its inward position while the cylindrical chamber or dough pocket 6 passes out of registration with the neck of the container and lip 14, and begins its outward stroke as the cam follower of the plunger passes along the arm 24'. As the plunger completes its outward stroke the dough in the cylindrical chamber is pushed out onto a suitable conveyor (not shown in the drawings).

Since no air enters the cylindrical chambers or dough pockets 6 from the outside as the plungers are moved inward, the operation of the device is practically noiseless, and in this respect is an improvement over the device shown in my previous patent mentioned above.

Scrapers 37 are attached to the lips 13 and held against the outer rim of the table 1 and outer surface of the plungers 15 by suitable springs 38. These scrapers remove any dough which might have a tendency to collect on such rim and plunger surfaces.

While I have described the operation of my device with reference to container 8 on the left, it is apparent that a similar operation takes place with reference to the other container 7. The amounts of dough taken from the other container may be greater or smaller in size than those taken from container 8, depending upon the position of the adjustable arms 25, 24. Thus, in my device it is possible to take different sized amounts from different containers simultaneously. It would be possible, by changing the shape and construction of cam element 22, to increase the number of containers from which the dough divider would remove portions of dough simultaneously. But, for practical purposes, probably one or two containers will be all that would ordinarily be used.

Fig. 4 shows one modification of my device and cam element. In this construction, which is designed for use with only one container, the cam element 38 has an adjustable arm 39. As the cam follower 40 moves over the partial circumference 41 of cam element 38, the plunger 42 remains in its extreme outward position. But when the plunger 42 is in registration with the feed neck 43 of the container the cam follower 40 is permitted to drop inward onto arm 39, thus permitting plunger 42 to move quickly to its extreme inward position. The plunger 42 remains in this position while its cam follower 40 passes over the curved surface 43 of arm 39, the curve 43 being an arc of a circle concentric with the rim of the rotating table 44. Then, when the cylindrical chamber 45 and plunger 42 have moved past the lip 46, the plunger is gradually moved to its extreme outward position once more. The adjustment of the arm 39 of course determines the extent to which the plunger 42 will be withdrawn, that is, determines the amount of dough which will be taken from the container each time. Since the inward movement of the plunger 42 takes place more rapidly when the cam element is arranged in this manner, the feed neck 43 of the container can be made much narrower than in the construction shown in Figs. 2 and 3. In any event, the width of the feed neck and lips and construction of cam must be such that the inward movement of the plungers will not occur until the corresponding cylindrical chamber is sufficiently in registration with the feed neck to prevent any air from the outside being drawn into said cylindrical chamber.

Finally, as is well known, air and gas bubbles form in bread dough as it stands. The amount and size of such bubbles depend on various factors, such as the age of the dough, etc. Under some circumstances so much air and gas may be occluded in the dough while in the container that when the dough is moved into the measuring pockets or chambers of the rotating table, the air or gas liberated from the dough will occupy sufficient portion of the space to prevent proper and accurate filling of the measuring chambers. I have discovered that this result may be prevented by liberating substantially the gases occluded in the dough; which may be accomplished by cutting thru the dough transversely extending furrows, prior to its introduction into the measuring cylinders, whereby the mass of dough will be temporarily separated into small slices or portions and the occluded air or gas given a chance to escape in the furrows formed in the dough.

In Fig. 1, at the bottom of container 8, such a means of liberating the air or gas is shown. At the connection between container 8 and feed neck 5 a removable ring 47 is placed (see Fig. 5), which ring carries a series of parallel transverse knives or cutters 48. As the dough is forced past these knives or cutters it is sliced and the occluded air and gas bubbles are liberated by such slicing. This air and gas, by the movement of the dough, will be caused to pass upon the inside walls of container 8 to the top of the container.

There are numerous variations which anyone skilled in the art might make in the means which I have shown for liberating bubbles from the dough, and also many numerous variations in the shape and construction of cam elements which might be made in my device without departing from the principal features of my invention. It is not my intention to limit myself to the precise construction described and illustrated.

I claim:

1. In a dough dividing machine the combination of an annular rotatable table having at its rim a cylindrical dough receiving pocket, a plunger mounted for reciprocation in said pocket, a cam located within said table, a spring-controlled pivoted lever including an arm held against said cam, said cam formed to cooperate with said lever for effecting the inward and outward movement of said plunger.

2. The combination described by claim 1 in which the cam located within said table is made adjustable to predetermine the capacity of said pocket.

3. In a dough dividing machine the combination of an annular rotatable table having at its rim a cylindrical dough-receiving pocket, a plunger mounted for reciprocation in said pocket, a cam located within said table, a spring-controlled pivoted lever including an arm held against said cam, said cam formed to cooperate with said lever for effecting the inward and outward movement of said plunger, a dough container, said container provided with a feed-neck discharging into said pocket when in registration therewith, the mouth of the feed-neck having oppositely laterally extending lips, and sliding in close relation against the rim of said table, the throat of the feed-neck having a lateral enlargement extending in the direction opposite that of the rotation of the table.

4. In a dough dividing machine, the combination of an annular rotatable table having at its rim portion a plurality of spaced dough receiving pockets, plungers mounted for reciprocation in said pockets, means for reciprocating said plungers, a gas tight dough container for receiving gas under pressure adapted to force dough under elastic gas pressure from said container, said container being provided with a feed neck discharging into each of said pockets when in registration therewith, the mouth of the feed neck having opposite laterally extending lips sliding in close relation against said table and one of said lips extending from said neck in the direction of movement of the table a distance greater than the width of the pockets in order to maintain a substantially gas tight relationship with the table during passage of the pockets under said lip, the throat of the feed neck having an enlargement extending peripherally of the table and being less in extent than the distance between pockets so as to coact with only one pocket at a time, the rotation of said table and the action of said plunger reciprocating means being relatively timed to hold the plunger in said outermost position until said pocket is in registration with said enlargement of the feed neck, and to complete the retraction of the plunger during the interval in which the dough receiving pocket traverses the feed neck.

5. The combination described by claim 4 in which the means for reciprocating the plunger include a cam element.

HERBERT CECIL RHODES.